United States Patent [19]

Chang

[11] 4,021,415

[45] May 3, 1977

[54] NITRILE CONTAINING AROMATIC POLYAMIDE POLYMERS

[76] Inventor: William J. H. Chang, 2673 Goldwood Drive, Rocky River, Ohio 44116

[22] Filed: Mar. 25, 1974

[21] Appl. No.: 454,562

Related U.S. Application Data

[63] Continuation-in-part of Ser. No. 442,631, Feb. 14, 1974, abandoned.

[52] U.S. Cl. .................... 260/78 TF; 260/46.5 E; 260/47 CZ; 260/47 CP; 260/49; 260/63 N; 260/65; 260/75 N; 260/78 R; 260/78.41; 260/881; 264/137; 428/423; 428/427; 428/430; 428/435; 428/446; 428/474; 428/480; 526/299
[51] Int. Cl.² ................ C08G 63/18; C08G 65/32; C08G 77/12; C08G 77/14
[58] Field of Search ........ 260/78 R, 78.5 F, 46.5 E, 260/65, 63 N, 75 N, 49, 78.4 N, 47 CZ, 47 CP

[56] References Cited

UNITED STATES PATENTS

| | | | |
|---|---|---|---|
| 3,516,967 | 6/1970 | Funer | 260/47 |
| 3,692,750 | 9/1972 | Duling et al. | 260/78.4 N |
| 3,836,506 | 9/1974 | Frost | 260/47 CP |
| 3,907,752 | 9/1975 | Frost | 260/47 CP |

*Primary Examiner*—Lester L. Lee
*Attorney, Agent, or Firm*—Donnelly, Maky, Renner & Otto

[57] ABSTRACT

Novel aromatic nitrile-containing polyester, polyamide, and silicone polymers are described. These nitrile-containing polymers are heat resistant and are used as fibers and resins and to prepare fiber-reinforced composites exhibiting outstanding mechanical strength at room and particularly elevated temperatures. Styrene-butadiene and styrene-acrylonitrile copolymers are described wherein at least some of the phenyl groups contain nitrile substituents. Composites having various shapes such as tires are described utilizing these nitrile-containing copolymers reinforced with fibers either containing aromatic nitrile groups or coated with resins containing nitrile substituted aromatic groups. These composites are useful in a variety of applications. The procedure for preparing such composites is disclosed.

2 Claims, No Drawings

NITRILE CONTAINING AROMATIC POLYAMIDE POLYMERS

CROSS REFERENCE TO RELATED APPLICATION

This application is a continuation-in-part of my earlier copending application Ser. No. 442,631, filed Feb. 14, 1974 now abandoned.

BACKGROUND OF THE INVENTION

The present invention relates to novel nitrile-containing aromatic polyester, polyamide and silicone polymers, and polymers and fibers prepared therefrom. The invention also relates to the preparation of thermally stable fiber-reinforced composites prepared from a mixture of nitrile-containing aromatic polyester, polyamide or silicone fibers and nitrile-containing aromatic polymers, such as silicone, polyester or polyamide polymers, heat treated under pressure in the presence of a catalyst. Copolymers of styrene wherein the phenyl group contains nitrile substituents also are described.

In the ordinary fiber-reinforced resin composites, there usually are only intermolecular adhesion and hydrogen bonding forces between the fiber and the resin. Examples of such fiber reinforced resins include conventional polyester resins reinforced with glass fibers. The absence of mainly chemical bonds between the fiber and the resin limits the strength of the composite. Ideally, the fiber in fiber-reinforced composites should be itself thermally stable if the thermal stability of the composite is a desirable objective. Thus, fibers such as prepared from Nylon 66 and Dacron may be utilized in fiber-reinforced resin composites but said composite is not especially high temperature stable. Other commercially available organic polymer fibers such as Nomax and Kevlar exhibit heat resistance but are not apparently capable of forming chemical bonds between the fiber and the resin.

Recently, high temperature and flame resistant aromatic copolyamide fibers have been described in the text entitled *High Temperature and Flame-Resistant Fibers*, Applied Polymer Symposia, No. 21, Interscience Publication, John Wiley & Sons, New York, 1972. One group of high temperature aromatic copolyamide fibers disclosed therein contain pendent carboxyl groups. When such carboxyl-containing fibers are used to fabricate composites, chemical bonds between the fibers and resins may exist but gaseous by-products will be produced. The voids in the composites formed on release of the gaseous by-product reduces the strength of the composite.

SUMMARY OF THE INVENTION

These and other problems have been solved or minimized by utilizing the novel nitrile-containing aromatic polyester, polyamide or silicone polymers of this invention as the resin and as the fiber utilized for reinforcing the resin. The nitrile-containing aromatic polyester, polyamide and silicone polymers of this invention have the general structures

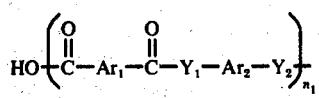

or

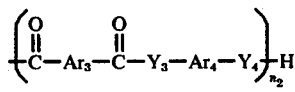

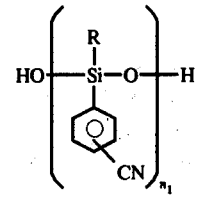

wherein $Ar_1$ and $Ar_2$ are aryl radicals, at least one of which contains a nitrile group, $Ar_3$ and $Ar_4$ are aryl radicals which may contain a nitrile group, $Y_1$, $Y_2$, $Y_3$ and $Y_4$ are O or NH groups, or mixtures thereof, $n_1$ is any integer greater than zero, $n_2$ is a positive integer or zero, and R is a hydrogen, alkyl, aryl, amino, hydroxyl, alkoxy, cyano, cyano-phenyl or halogen radical. The above-described polymers can be spinned into fibers which are useful in textile applications and also can be prepared as resins, both of which are useful in preparing the composites of the invention.

The composites of the invention are prepared by heat treating a mixture of the aromatic polyester, polyamide or silicone polymer described above or other nitrile-containing high temperature resistant polymers with fibers prepared from the nitrile-containing aromatic polymers described above or with glass fibers coated with said polymers. In lieu of the above nitrile-containing polymers, styrene-butadiene and styrene-acrylonitrile copolymers containing phenyl groups having nitrile-substituents can be utilized in forming composites. The heat treatment may be conducted in the presence or absence of a catalyst employing heat or heat and pressure. The composites prepared in this manner possess chemical bonds between the fibers (or coating on the fibers) and the resins, release no gaseous by-product and, hence, exhibit high mechanical strength and thermal stability and are useful in high temperature applications as required in household, industrial and military applications.

DESCRIPTION OF THE PREFERRED EMBODIMENTS.

The nitrile-containing aromatic polyester or polyamide polymers of this invention can be prepared by the reaction of nitrile-containing aromatic diacids with aromatic diamines, aromatic glycols or hydroxy-substituted aromatic amines. The preparation of high molecular weight polyester and polyamide polymers from the above-described reactant is well known in the art. Such high molecular weight polymers can be prepared by such techniques as the low temperature solution polycondensation method or the interfacial polymerization technique. The high molecular weight polyester and polyamide polymers of my invention have the following general structure

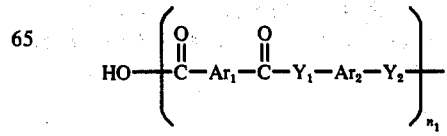

-continued

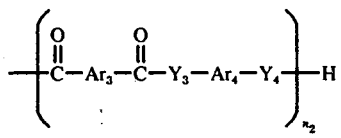

wherein $Ar_1$ and $Ar_2$ are aryl radicals, at least one of which contains a nitrile group, $Ar_3$ and $Ar_4$ are aryl radicals which may contain a nitrile group, $Y_1$, $Y_2$, $Y_3$ and $Y_4$ are O or NH groups, or mixtures thereof, $n_1$ is any integer greater than zero, and $n_2$ is a positive integer or zero.

The nitrile-containing aromatic dicarboxylic acids useful in the preparation of the polymers are those having the following general structure

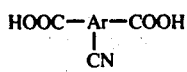

wherein Ar may be any one of the following radicals

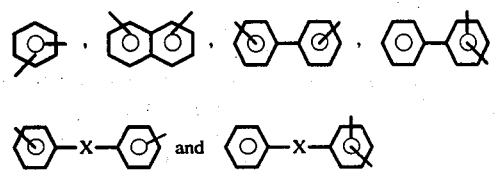

wherein $X = O$, $CH_2$, $C=O$, $SO_2$, So or $C(CH_3)_2$. The nitrile group may be located in any available open position in the aromatic ring and other radicals may be attached to the aromatic radical such as halide, alkyl, alkoxy, nitro radicals, so long as these do not interfere with the desired polymerization reaction. Nitrile-containing aromatic dicarboxylic acids of the type described above either are commercially available or can be prepared by known techniques. For example, 5-cyano isophthalic acid can be prepared from 5-amino isophthalic acid by diazotization with HCl and sodium nitrite followed by coupling with sodium cyanide and cuprous cyanide. Alternatively, if the aromatic amine or hydroxy compound reacted with the dicarboxylic acid contains pendent nitrile groups, the aromatic dicarboxylic acid used need not contain a nitrile group also.

The aromatic diamines useful in the preparation of the polyamides of the invention have the general formula

wherein $Ar_2$ may be any of the aromatic radicals listed above for $Ar_1$. Moreover, the aryl radical may contain a nitrile group in any available open position of the aromatic ring. Such aromatic diamines, either with or without the pendent nitrile group on the aryl radical are commercially available or readily prepared by known techniques.

The aromatic glycols which are utilized in the preparation of the polyester polymers of the invention have the general formula

where the aryl radical $Ar_2$ is as defined above and may contain a pendent nitrile group in any available open position of the aromatic ring.

Also useful in the preparation of the polymers of this invention are the hydroxy-substituted aromatic amines having the following structure

wherein $Ar_2$ is as defined above and may contain pendent nitrile groups in any available open position of the aromatic ring. These hydroxy-substituted aromatic amines either are commercially available or can be readily prepared by known techniques.

As mentioned above, the polyamide and polyester polymers of this invention are prepared by reacting the above-described aromatic dicarboxylic acids with an aromatic diamine, an aromatic glycol or hydroxy-substituted aromatic amine of the type described above. The aromatic radical in at least one of the reactants must contain a pendent nitrile group, and in some instances, the aryl radicals of both reactants will contain a pendent nitrile group. Various combinations of the aromatic dicarboxylic acids with the diamines, glycols, hydroxy-substituted aromatic amines can be condensed to form polymers with various properties. It is critical to the present invention, however, that at least one of the monomeric reactants contain an aryl radical with a pendent nitrile group. For example, a polymer of this invention can be prepared by condensing a nitrile-containing aromatic dicarboxylic acid with an aromatic diamine containing no nitrile group in the aromatic radical. Alternatively, a polymer of this invention can be prepared by reacting an aromatic dicarboxylic acid containing no pendent nitrile groups with an aromatic diamine containing a pendent nitrile group on the aromatic radical. Additionally, both the aromatic group in the dicarboxylic acid and the aromatic group in the diamine may contain pendent nitrile groups. The aromatic dicarboxylic acids utilized in the preparation of the polyesters and polyamides of this invention may be in addition to the free acid, low molecular weight esters such as dimethyl isophthalate, or the corresponding isophthalyl dihalide such as m-phthalyl dichloride having the formula $C_6H_4(COCl)_2$ both of which will react readily with the active hydrogen-containing aromatic diamines and glycols to form polyamides and polyesters.

The molecular weights of the polyester and polyamide polymers of this invention may be as low as 100 or as high as 100,000 or more. Molecular weights within the range of from about 1,000 to about 30,000 are especially useful although the particular molecular weight will depend upon the particular end use of the polymer.

The following examples illustrate the preparation of the polyester and polyamide polymers of this invention.

EXAMPLE 1

This example illustrates the preparation of a nitrile-bearing aromatic polyamide by the melt polymerization process. In an open reaction vessel, equal molar amounts of the dimethyl ester of 5-cyano isophthalic acid and 4,4'-diamino diphenyl methane are heated to melt at a temperature above about 250° C. and maintained at this temperature to effect polymerization to a molecular weight of over 10,000. The nitrile-bearing polyamide prepared in this manner is a high temperature resistant polymer.

EXAMPLE 2

This example illustrates the preparaion of nitrile-bearing aromatic polyamides by the solution polymerization process. In a reaction vessel, a mixture of equal molar amounts of dimethyl-5-cyano isophthalate and 3,3+-diamino-diphenyl either in N,N'-dimethyl formamide (65% by weight) and toluene (5% by weight) is heated to reflux temperature, and the water gradually is separated from the reaction vessel until a clear resin solution is obtained within a viscosity corresponding to a molecular weight of about 5,000, or higher, depending on the end use of the polymer.

EXAMPLE 3

Example 1 is repeated except that the 4,4'-diamino diphenyl methane is replaced by an equal molar amount of 4,4'-dihydroxy diphenyl methane.

The polymers of the invention also include aromatic silicone polymers wherein the aromatic group contains a nitrile substituent. Such polymers have the general structure

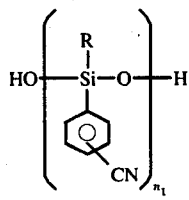

wherein R is a hydrogen, alkyl, aryl, amino, hydroxyl, alkoxy, cyano, cyano-phenyl or halogen radical, and $n_1$ is any integer greater than zero.

The alkyl and aryl radicals include methyl, ethyl, propyl, phenyl, tolyl, and aryl radicals containing substituents such as, for example, nitrile, halide, hydroxyl, and amino radicals.

The nitrile-containing aromatic silicone polymers may be prepared by introducing the nitrile group into the corresponding aromatic silicone-containing halide radicals on the aromatic ring. Iodine substituted aromatic silicones can be prepared by the partial iodination of the aromatic silicone with iodine and iodic acid in nitrobenzene using the procedure described by R. Beckerbauer and H. E. Baumgarten in *J. Polymer Science*, Part A, Vol. 2, pages 503–510 (1964). The iodine substituted aromatic silicone polymer is treated with a solution of freshly prepared cuprous cyanide in N-methyl pyrrolidine at reflux for about four hours. The mixture is added to $FeCl_3.6H_2O$ in aqueous hydrochloric acid and heated to give the desired nitrile-containing aromatic silicone polymer.

The bulk polymers of this invention such as those described above may be converted to filaments and fiber by spinning. In most instances, the spinning process requires solution or melting of the polymer. Where the polymer can be melted under reasonable conditions, the production of a fiber by melt spinning is preferred over solution processes. In other instances, solutions of the polymer in a solvent are prepared and subjected to the spinning operation. The solvent may then be removed by evaporation or by leeching out into another liquid which is miscible with the spinning solvent. The spinning techniques for converting the bulk polymers to filaments and fibers are well known in the art.

One of the applications of the bulk polymers and fibers of this invention involves the preparation of thermally stable fiber-reinforced composites comprising mixtures of the fibers or glass fibers coated with the aromatic nitrile-containing polymers and bulk polymer. When such composites are heated to an elevated temperature under pressure with a catalyst, the resulting fiber-reinforced composite exhibits outstanding mechanical strength at room temperature and at elevated temperatures.

In one example of the preparation of the composite of this invention, polymer fibers such as those prepared by spinning the polymers obtained in Examples 1–3 are impregnated with a mixture of a catalyst such as zinc chloride and a high temperature resistant nitrile-containing polymer such as the polymer described in the preparation of Example 1 but with a lower molecular weight contained in a solvent such as dimethyl formamide or dimethyl acetamide. After impregnation of the fiber, the solvent is removed by raising the temperature and the composite is molded and heated to a temperature to about 200° to 400° C. at up to 500 psi pressure for about five hours. This resulting composite can be of any shape such as sheets, plates, rods, tubes, etc., and the product exhibits outstanding mechanical strength at room and at elevated temperatures.

In preparing the composites of this invention, the polymer fiber and the bulk polymer utilized therein may be the same or similar polymers. That is, the fiber and the bulk polymer may be similar in chemical structure and composition but different in physical properties due to slight variations in the structure and/or the molecular weights. In general, it will be desired that the bulk polymer utilized in the formation of the composite have a lower molecular weight than the fiber material. The initial fabricating temperature is lower than the melting temperature of the resin or the fiber. For example, in the preparation of a composite from a bulk polymer having a melting point of approximately 200° C. and a fiber having a melting point of about 250° C., the mixture with a catalyst is heated to 200° C. for 2 hours to free the solvent, at 250° C. and 200 psi for one hour, at 300° C. and 500 psi for four hours and post cured at 350° C. for 1 day or more. As the temperature is raised, the melting temperature of the bulk polymer and the fiber increases as a result of the curing reaction which occurs creating high temperature resistant composites.

The fibers utilized in the preparation of the composite may be fibers prepared from the nitrile-containing aromatic polyester, polyamide or silicone polymers of the invention described above. The bulk polymer utilized for the preparation of the composite may be a nitrile-containing aromatic polymer and may be, for example, any of the nitrile-containing polyester, polyamide, or silicone polymers described above, or nitrile-containing styrene-butadiene copolymers, styrene-acrylonitrile copolymers, or mixtures thereof, wherein at least some of the phenyl groups within the copolymer contain a nitrile substituent. These latter nitrile-containing copolymers are prepared by the method described by R. Beckerbauer and H. E. Baumgarten referred to above for preparing the nitrile-containing aromatic silicone polymers. These copolymers are the nitrile derivatives of the well known SBR, ABS, and SAN polymers used for forming composites reinforced with fabric and formed into shapes such as tires. The presence of the nitrile group on the aromatic ring of the copolymer renders the copolymers particularly useful in preparing the composites of the invention as is described below.

The fibers utilized in the preparation of the composite may be either small chopped up fibers indiscriminately mixed with the bulk polymer or formed into a shape such as a sheet wherein the small fibers are randomly oriented within the sheet. Alternatively, longer length fibers or filaments can be utilized for the preparation of sheet-like structures wherein the longer fibers are arranged either randomly or in an oriented pattern or fabric. The term "fiber" is used in this application and includes ribbons of the polymer as well as the more conventional fibers and filaments having substantially oval, round or elliptical cross sections. The actual shape of the fiber utilized in the preparation of the composite will be determined by the end use of the composite.

As mentioned above, the composites of this invention are prepared by contacting the heat-resistant organic fibers, or the organic coated glass fibers, described with a high temperature resistant, aromatic nitrile-containing polymer and heating the mixture with a catalyst to an elevated temperature and moderate pressure.

The incorporation of a catalyst into the mixture of fiber and bulk polymer is optional although in most instances it is preferred to utilize a catalyst. The catalyst is the type which effects an aromatic nitrile trimerization to form symmetrical triazines. Examples of catalysts which can be utilized include the amides and hydrides of alkaline and alkaline earth metals, sulfuric acid, bromine, metallic sodium and aluminum chloride. Other metal salts also are useful as catalysts and these include the metals of atomic number from 22 to 30 inclusive. Examples of these salts include manganous bromide acetate monohydrate, cobalt bromide hexahydrate, zinc chloride, titanium chloride, vanadyl chloride, ferric chloride, chromic chloride hexahydrate, cupric sulfate pentahydrate, cupric cyanide, cobalt bromide dihydrate, and cobalt bromide. Although the hydrates of certain of the above salts have been disclosed as being useful, it is preferred to use anhydrous salts.

The length of time of the heat treatment of the mixture of fiber, bulk polymer and catalyst will depend upon the particular catalyst, the catalyst concentration, the temperature and the particular polymers employed. Generally, from about 0.1 to about 5% of the catalyst based on the amount of polymer is sufficient although it may be omitted completely. Reaction times will vary from about one hour to about 20 hours or more. The composites of this invention may contain up to 50% or more of the fiber reinforcement material and generally will contain at least 10% of the fiber material.

Other additives and reinforcement materials normally utilized with polyester and polyamide polymers may be incorporated into the composites of this invention. For example, inorganic fillers such as clay, talc, calcium carbonate and calcium silicate may be used for economic reasons or to alter the mechanical and electrical properties of the polymers and the composites. Pigments may be utilized to impart color to the composite although the effect of the pigments on the cure should be considered. Ultraviolet absorbers are added to prevent deterioration on prolonged exposure to sunlight and flame retardants are used for fire resistance.

Examples of flame retardants which may be utilized include antimony oxide, hydrated alumina and chlorinated waxes.

Composites prepared from the aromatic nitrile-containing copolymers of styrene-acrylonitrile, styrene-butadiene, and mixtures thereof, also may contain the usual vulcanization and reinforcing additives, as well as accelerators. Examples of vulcanization additives include sulfur, sulfur chloride, organic peroxide, azo compound, etc. Reinforcing fillers include carbon black, silica, talc, etc. Examples of accelerators include the oxides of lead, calcium, magnesium and zinc as well as organic accelerators such as the thioureas, thiophenols, mercaptans, thiuram sulfides, urea, guanidines, etc.

The composites prepared in accordance with the procedures of this invention from the combination of a nitrile-containing aromatic polyester, polyamide or silicone polymer fiber with the nitrile-containing aromatic polymers are characterized by improved mechanical strength and thermal stability. Unlike fiber reinforced composites utilizing non-reactive glass fibers or organic fibers without pendent reactive groups, the fibers of the present invention or the glass fibers coated with a polymer containing pendent nitrile groups of the aromatic radicals undergo a chemical reaction with the bulk polymer through the nitrile group of the bulk polymer to form a strong chemical bond between the fiber (or fiber coating) and the polymer without releasing any gaseous by-product. The trimerization of aromatic nitriles to form symmetrical triazine rings has been described elsewhere in the published literature. For example, in U.S. Pat. No. 3,060,179, symmetrical triazines are prepared from aromatic nitriles by heating the aromatic nitriles to temperatures in a range from 200°–400° C. in the presence of metal salt catalysts such as cobalt chloride. Therefore, it may be expected that the nitrile radicals on the fibers or fiber coating react with nitrile radicals of the bulk polymer resulting in the formation of a chemical bond and, more particularly, symmetrical triazine ring.

The novel composite of this invention may be generally represented but not limited by the following structure

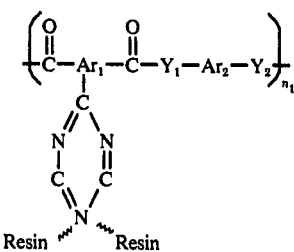

wherein $Ar_1$, $Ar_2$, $Y_1$, $Y_2$ and $n_1$ are as defined above and Resin represents the backbone of the bulk polymer. A similar triazine ring is postulated for the aromatic nitrile-containing silicone polymers of the invention.

The following examples illustrate the preparation of the composites of this invention.

EXAMPLE 4

A mixture comprising 50% by weight of the polymer of Example 1 and about 0.1% based on the weight of the polymer of zinc chloride in a solvent such as dimethyl formamide is prepared. This liquid mixture is impregnated into fibers prepared from the polymer of Example 1, which fibers are in sheet form. The solvent is removed by heating the impregnated sheet at a temperature sufficient to volatilize the solvent. The impregnated sheet is placed in a mold and a pressure of about 500 psi is applied while the temperature of the mold is gradually raised to about 300° C. over a period of about 4 hours. The composite is then post cured at a temperature of about 350° C. for 3 hours. The composite prepared by this manner exhibits high mechanical strength at room and elevated temperatures.

EXAMPLE 5

The procedure of Example 4 is repeated except that the catalyst utilized in the mixture is cobalt chloride.

EXAMPLE 6

The procedure of Example 4 is repeated except that the fibers utilized are fibers prepared from the polymer of Example 2.

EXAMPLE 7

The procedure of Example 4 is repeated except that the bulk polymer utilized in the mixture is a cyanophenyl silicone resin polymer.

EXAMPLE 8

The procedure of Example 4 is repeated except that the fibers are prepared from the polymer of the type described in Example 1 having a molecular weight of about 20,000, and the bulk polymer is a polymer of the type described in Example 3 except having a molecular weight of 7,500.

EXAMPLE 9

The procedure of Example 4 is repeated except that the fibers utilized in the mixture are glass fibers coated with a thin film of a cyanophenyl silicone polymer.

EXAMPLE 10

A graft copolymer is prepared by adding styrene and acrylonitrile monomers to a latex of polybutadiene with agitation while maintaining the mixture of about 50° C. Potassium persulfate catalyst is then added and the reaction is allowed to continue until the monomers have been copolymerized. The emulsion is coagulated, washed and dried to give a white powder. This powder can be used as formed or blended with additional styrene-acrylonitrile copolymer as desired.

The above prepared grafted copolymer is iodinated and the iodine substituent converted to a nitrile substituent as described above.

The nitrile-containing grafted copolymer is dissolved in a suitable solvent and about 0.1% of zinc chloride, based on the weight of the copolymer, is added. The liquid mixture is then poured into a mold around fibers arranged in fabric form. In this example the fibers are glass fibers coated with an aromatic nitrile-containing silicone polymer of the type described above.

The solvent is removed by heating the mixture at a temperature sufficient to volatilize the solvent whereupon a pressure of about 500 psi is applied on the mold while the temperature is gradually raised to about 300° C. over a period of about 4 hours. The composite then is post cured at about 350° C for 3 hours. This composite exhibits high mechanical strength at room and elevated temperatures.

EXAMPLE 11

The procedure of Example 10 is repeated except that the fibers of Example 4 are utilized in lieu of the coated glass fibers.

The fiber-polymer composites described above may be utilized in applications where thermal stability and high strength are desirable. Of course, the polymer fibers themselves, being high temperature resistant, may be utilized in a wide variety of applications and the preparation of textile materials. Examples of the application of the composites of the invention include ovenware, appliance parts, auto parts, electrical laminates, electric switch gears, insulators, heavy duty circuit breakers, aircraft structural parts, rocket motor cases, pressure bottles, encapsulation of electronic components, grinding wheels and other temperature mechanical parts, jet engine components, tires, soles of footwear, etc.

I claim as my invention:

1. Nitrile-containing aromatic polyamide polymers having the general structures

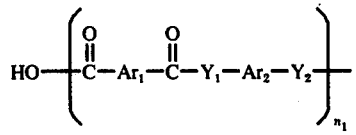

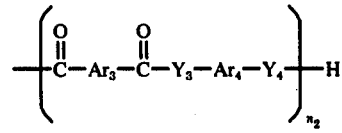

wherein $Ar_1$ and $Ar_2$ are aryl radicals, at least one of which contains one nitrile group, $Ar_3$ and $Ar_4$ are aryl radicals which may contain one nitrile group, $Y_1$, $Y_2$, $Y_3$, and $Y_4$ are O or NH groups, or mixtures thereof, at least one of which must be an NH group, and wherein $Y_1$ equals $Y_2$, $Y_3$ equals $Y_4$ and $Y_1$ is different from $Y_3$, $n_1$ is any integer greater than zero, $n_2$ is a positive integer, and the molecular weight of the polymer is from about 100 to about 1,000.

2. Nitrile-containing aromatic polyamide polymers having the general structures

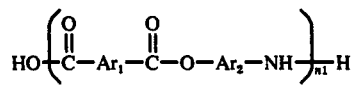

wherein $Ar_1$ and $Ar_2$ are aryl radicals, at leat one of which contains a nitrile group, $n_1$ is an integer greater than zero, and the molecular weight of the polymer is from about 100 to about 1,000.

* * * * *